United States Patent [19]

Kemeny

[11] Patent Number: 5,093,746

[45] Date of Patent: Mar. 3, 1992

[54] CURRENT INJECTION MODULATOR

[75] Inventor: Peter C. Kemeny, Camberwell, Australia

[73] Assignee: Australian Telecommunications Corporation, Melbourne, Australia

[21] Appl. No.: 547,872

[22] Filed: Jul. 3, 1990

Related U.S. Application Data

[63] Continuation-in-part of Ser. No. 403,534, filed as PCT/AU88/00491, Dec. 20, 1988, Pat. No. 5,052,008.

[30] Foreign Application Priority Data

Jan. 6, 1988 [AU] Australia ............... P16188/88

[51] Int. Cl.$^5$ ............... G02F 1/03; G02F 1/015; H01L 33/02; G02B 5/14
[52] U.S. Cl. ............... 359/254; 357/315; 385/3; 385/14
[58] Field of Search ............ 350/96.13, 55, 355, 350/356; 357/16, 17, 19; 385/3, 8, 14; 359/254, 315

[56] References Cited

U.S. PATENT DOCUMENTS

| | | | |
|---|---|---|---|
| 4,521,069 | 6/1985 | Ikeda | 350/96.13 |
| 4,525,687 | 6/1985 | Chemla et al. | 332/7.51 |

FOREIGN PATENT DOCUMENTS

| | | |
|---|---|---|
| 3210980 | 4/1982 | Fed. Rep. of Germany . |
| 58-135690 | 11/1981 | Japan . |
| 2126780 | 3/1984 | United Kingdom . |
| 84/03397 | 8/1984 | World Int. Prop. O. . |

OTHER PUBLICATIONS

Ogura et al., "Lasing Characteristics and Structure of Distributed Feedback Surface Emitting Laser Diode with AlGa/GaAs Multilayered Heterostructure", *Journal of Vacuum Science*, vol. 3, No. 2, pp. 784-7, Mar.-Apr. 1985.
Ogura et al., "Distributed Feedback Surface Emitting Laser Diode with Multilayered Heterostructure", *Japanese Journal of Applied Physics*, vol. 23, No. 7, pp. L512-514, Jul. 1984.
Ogura et al., "Surface Emitting Laser Diode with Multilayered Heterostructure Reflectors", *Collected Papers of 2nd International Symposium on Molecular Beam Epitaxy and Related Techniques*, pp. 69-72, 1982.
Uchiyama et al., "Consideration on Threshold Current Density of GaInAsP/InP Surface Emitting Junction Lasers", *IEEE Journal of Quantum Electronics*, vol. QE-22, No. 22, pp. 302-309, Feb. 1986.
Iga et al., "Room Temperature Pulsed Oscillation of GaAlAs/GaAs Surface Emitting Junction Laser", *IEEE Journal of Quantum Electronics*, vol. QE-21, No. 6, pp. 663-668, Jun. 6, 1989.
Kenery, P. C.; "III-IV Semiconductor Thin-Film Optics . . . ", *J. Appl. Phys.*, vol. 64, No. 11, pp. 6150-4, 12/1/88, abst. only provided.
Boyd et al., "Multiple Quantum Well Reflector/Conductor", *Appl. Phys. Lett.*, vol. 50, #17, pp. 1119-21, 4/21/87; abst. only.
Miller et al., "High Frequency . . . Optical Modulator", *IEEE Trans. Elect. Devices*, vol. 30-34, #11, p. 2362; abst. only.

*Primary Examiner*—Nelson Moskowitz
*Attorney, Agent, or Firm*—Fish & Richardson

[57] ABSTRACT

A current injection modulator includes structure defining a single crystal substrate, having some refractive index, on which are positioned, in succession, an inside reflector formed by a first set of epitaxial single crystal layers, a resonator layer and an outside reflector formed by a second set of epitaxial single crystal layers. At least a first part of the structure, including one or more of the inside reflector, substrate and resonator layer, is electrically conductive (either p-type or n-type conduction) and at least a second part of the structure, including the outside reflector and/or the resonator layer, is electrically conductive (either n-type or p-type conduction, but different from the first part). The structure further includes first and second electrical conductors in ohmic contact respectively with the first and second part of the structure, thereby to enable, by application of electrical potential to the electrical conductors, an electrical current to flow through the structure to cause it to vary the refractive index of the resonator layer pursurant to changes in the electrical current whereby to vary the light transmissivitiy of the modulator for modulating a light beam passing through the modulator in accordance with the changes in the electrical current.

13 Claims, 1 Drawing Sheet

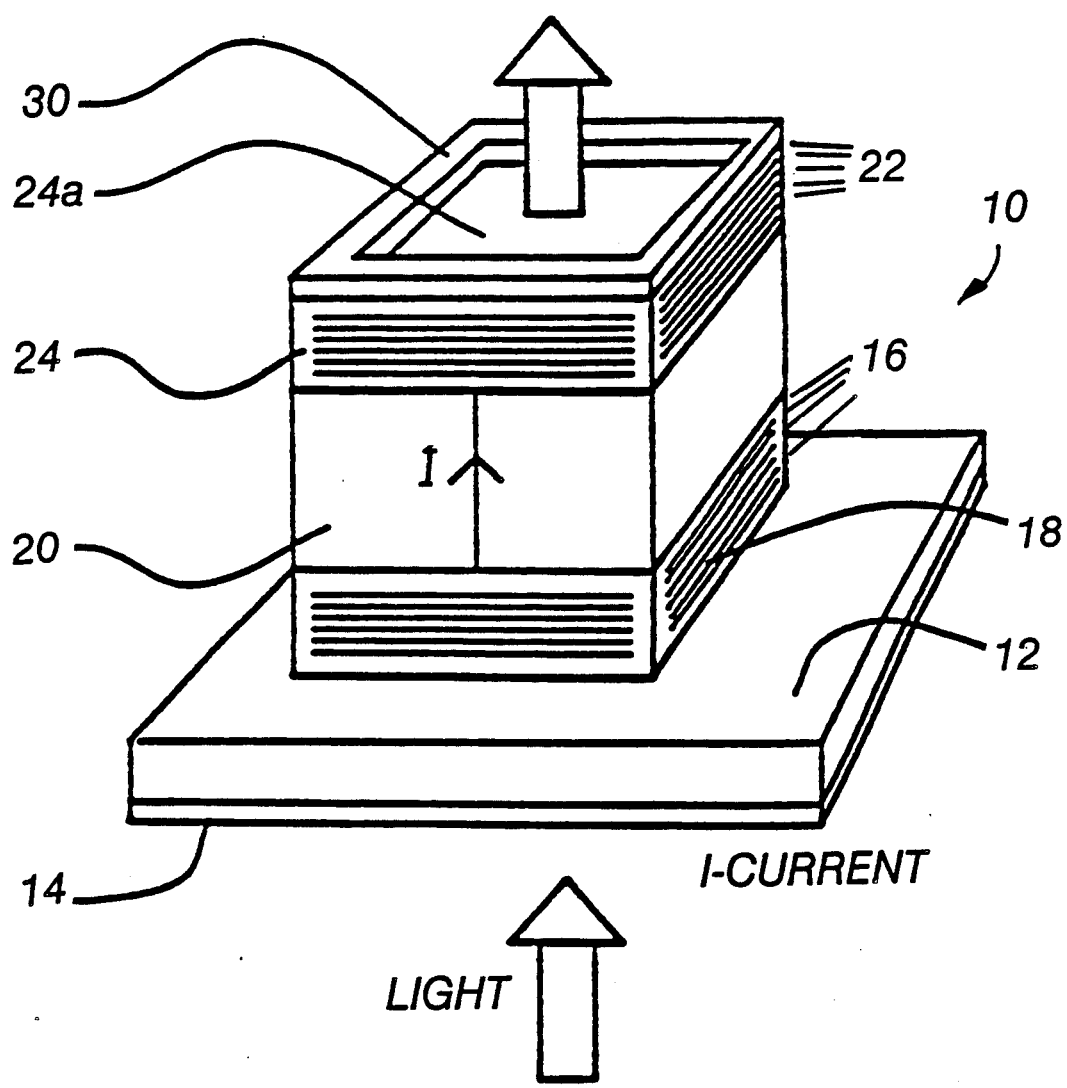

CURRENT INJECTION MODULATOR

This application is a continuation-in-part of U.S. application Ser. No. 07/403,534, filed as PCT/AU88/00491, Dec. 20, 1988, now U.S. Pat. No. 5,052,008.

This invention relates to a current injection modulator.

The device is able to modulate the intensity of transmitted or reflected light having a wavelength at or near a number a number of discrete wavelengths which bear a simple relationship to each other. These discrete operating wavelengths may be chosen arbitrarily within a wide range by adjusting the dimensions and/or composition of the device.

In one aspect, the invention provides a current injection modulator comprising structure defining a single crystal substrate, having some refractive index, on which are positioned, in succession, an inner reflector formed by a first set of epitaxial single crystal layers, a resonator layer, an outside reflector formed by a second set of epitaxial single crystal layers, at least one part of said structure, being one or more of the inside reflector, substrate and resonator layer, being electrically conductive and of either p-type or n-type conduction, at least another part of said structure, being one or more of the outside reflector, and resonator layer, being made electrically conductive and being of either n-type or p-type conduction, but of different conduction type to said one part, said structure further including first and second electrically conductive means making ohmic contact respectively to said one part and said another part of said structure whereby to enable, by application of electrical potential to said electrically conductive means, an electrical current to flow through said structure to cause it to vary the refractive index of said resonator layer pursuant to changes in the electrical current whereby to vary the light transmissivity of the modulator for modulating a light beam passing through the modulator in accordance with said changes in said electrical current.

The layers comprising at least one said reflector may have alternating high and low refractive indices and thicknesses such that a compositional periodicity of optical thickness $\lambda/2$ or an odd multiple thereof is achieved, where $\lambda$ is the longest of a number of possible discrete wavelengths of light to be modulated by the particular device. In an alternative embodiment the composition and hence the refractive index of at least one said reflector can be varied in a continuous or piecewise manner such that a compositional periodicity having optical thickness of $\lambda/2$ or some odd multiple thereof is achieved.

Phases $\phi_1$ and $\phi_2$ are defined, with respect to the complex reflectance amplitudes $r_i$, $r_o$ of the inside and outside reflectors, by the following relationships:

$$r_i = r_1 \exp(j\phi_1)$$

where $r_1$ is the magnitude of reflectance of layers comprised in the inner reflector, and $\phi_1$ is the phase shift on such reflectance.

$$r_o = r_2 \exp(j\phi_2)$$

where $r_2$ is the magnitude of reflectance of layers in the outer reflector, and $\phi_2$ is the phase shift on such reflectance.

The refractive index $N_b$ of the layer of the inside reflector adjacent to the resonator layer, and $N_a$, the refractive index of the layer of the outside reflector immediately adjacent the resonator layer should be related to $N_r(I)$, the refractive index of the resonator layer at any particular current through the modulator either by:

$$N_b < N_r(I) \text{ if } N_a < N_r(I)$$

or $$N_b > N_r(I) \text{ if } N_a > N_r(I)$$

The invention is further described by way of example only with reference to the accompanying drawings, the single FIGURE of which is a diagrammatic perspective view of a current injection modulator constructed in accordance with this invention.

The current injection modulator 10 shown in the drawing comprises a substrate 12 in the form of a single crystal having a refractive index $N_s$. The substrate may be provided on its "rear" face with one or more layers of material intended to reduce the reflectivity of the rear surface from its uncoated value, at the wavelength of operation of the modulator, and may have regions of metalisation intended to make ohmic contact to the device. In this instance, a layer 14 of metalisation is shown.

Upon the substrate is a first set of epitaxial single crystal layers 16 which together constitute an inside reflector 18. The composition, thickness, and a number of these layers constitute variables which are selected to give desirable properties of reflectivity, electrical conduction, transparency, stablity and crystal growth parameters, in accordance with known factors for thin film optics and semiconductor technology.

The inside reflector is characterized in part, by its complex reflectance amplitude $r_i$ where:

$$r_i = r_1 \exp(j\phi_1),$$

where $r_1$ is the magnitude of reflectance of the set of layers comprising the inner reflector, and $\phi_1$ is the phase shift on such reflectance.

Positioned immediately above and in contact with inside reflector 18 is a resonator layer with thickness "d" and refractive index $N_r(I)$ for light travelling through the layer with any polarisations, where I is the current flowing through the modulator. This refractive index should have the property that either:

$$N_b < N_r(O) \text{ if } N_a < N_r(O)$$

or $$N_b > N_r(O) \text{ if } N_a > N_r(O),$$

where $N_b$ is the refractive index of the layer of the inside reflector 18 which is adjacent to the resonator layer and $N_a$ is the refractive index of that one of a number of layers 22 next described which is immediately adjacent and in contact with resonator layer 20, but at the opposite side thereof to inside reflector 18.

Above the resonator layer there is provided the aforementioned set of layers 22 each in the form of an epitaxial single crystal. These layers together constitute an outside reflector 24. As with the inside reflector 18, the layers 22 constituting the outside reflector are selected to give desirable properties of reflectivity, electrical conduction, transparency, stablity and crystal growth parameters, in accordance with known factors for thin film optics and semiconductor technology.

The outside reflector 24 may be characterized in part by its complex reflectance amplitude $r_o$ where:

$$r_o = r_2 \exp(j\phi_2).$$

Where $r_2$ is the magnitude of reflectance of the set of layers comprising the outer reflector and $\phi_2$ is the phase shift on such reflectance.

At the side of the outside reflector 24 remote from resonater layer 20, the reflector 24 is in contact with incident medium having refractive index $N_i$.

The substrate and subsequent material layers may be single crystals composed of any compounds or alloys of the elements of the periodic table, or pure elements, suitable for the purpose. For example, the substrate and subsequent layers may be composed of Gallium, Aluminium and Arsenic combined in particular proportions in particular layers.

Alternatively, the substrate and subsequent layers may be composed of Gallium, Indium, Arsenic, and Phosphorous combined in particular proportions in particular layers.

Alternatively, the substrate and subsequent layers may be composed of Gallium, Indium, Aluminium, Arsenic, and Antimony combined in particular proportions in particular layers.

Alternatively, the substrate and subsequent layers may be composed of Mercury, Cadmium, Manganese and Tellurium combined in particular proportions in particular layers.

Alternatively, the substrate and subsequent layers may be composed of Lead, Sulphur Tellurium and Selenium combined in particular proportions in particular layers.

Other material systems are possible and will be apparent to those skilled in the art.

In addition each of the said layers may in turn be composed of still finer layers, known as superlattice or as multi-quantum-well structures, or the said layers may be continuously graded in composition.

It is necessary that some part of the inside reflector and/or the substrate and/or the resonator layer be made electrically conducting by the incorporation of impurity atoms. This conduction, referred to hereinafter as conduction of the first type, may be by electrons (n-type) or holes (p-type).

A first metalisation (14) appropriate to make ohmic contact to the doped material of the first conduction type is applied on the substrate 12 or elsewhere on or near the modulator so as to make ohmic contact to this doped material only.

Some part of the outside reflector 24 and/or the resonator layer 20 is made electrically conducting by the incorporation of impurity atoms. This conduction, hereinafter called conduction of the second type, may be by electrons (n-type) or holes (p-type). If the first conduction type is n-type, then the second conduction type is p-type and if the first conduction type is p-type, the second conduction type is n-type.

A second metalisation appropriate to make ohmic contact to the doped material of the second conduction type is applied on or near the modulator so as to make ohmic contact to this doped material only. Such metalisation is shown as a metalised loop 30 formed on the surface 24a of outside reflector 24 remote from resonator layer 20.

It is convenient to refer to the entirety of the substrate 12, the inner and outer reflectors 18, 24, the resonator layer 20, together with the described metalisation and the other coatings to either side of the layer 20 or reflectors 18, 24, as a "material structure". One or more modulators or groups of modulators may be formed on the material structure by etching or by other means of isolation so that when a forward bias voltage is applied between the metalisation making contact to those parts of the material structure which are respectively of first and second conduction types, and associated with a particular modulator or group of modulators, current flow occurs predominatly along a direct path between the n-type and p-type materials of each particular modulator so connected. The forward bias is, as is conventional, obtained by raising the electrical potential of the p-type material above that of the n-type material.

The modulator structure described here and illustrated in the figure may be partially or fully surrounded by materials including semiconductors (either irradiated by energetic particles such as protons or otherwise), polymers, or dielectrics to provide passivation, reduce or enhance surface recombination, provide optical confinement, or to enhance environmental stability.

In plan view (from above) the modulator may be any shape including square, rectangular, circular or ellipsoidal. The side walls, if any, may be perpendicular to the substrate, or sloping or curved.

As mentioned, modulation of incident light on the modulator is effected by varying the current flowing through the device.

The refractive index $N_r(I)$ varies as some function of the current flowing through the resonator layer 20, arising as the result of the external application of a potential difference, accross the device.

The modulator has a maximum of transmission at wavelengths $\lambda_m$ given by:

$$\frac{2\pi N_r(I) d \cos\theta}{\lambda_m} - \frac{\phi_1 + \phi_2}{2} = m\pi$$

$$m = 0, 1, 2 \ldots$$

where $\theta$ is the angle of proprogation of light in the resonator layer 20, relative to the normal of this layer and the phases $\phi_1$, $\phi_2$ (as previously defined), refer to light of any particular polarisation present in the resonator. The refractive index of the resonator is $N_r(I)$ when a current I flows through the device.

Modulation of the transmission through the device of a beam of incident light of any particular wavelength $\lambda_i$, is achieved by varying the current, I, and hence the refractive index $N_r(I)$. This variation in refractive index causes the wavelength positions of the transmission maxima of the device to vary, according to the expression above given, relative to the wavelength $\lambda_i$, and hence the transmission of light through the device is modulated. The intensity of the reflected light as well as the phases of the transmitted and reflected beams are also modulated. These phase modulations arise as a result of the changing optical thickness of the resonator layer, occuring when the current I is varied. Generally, the optical thickness $N_r(I) d \cos\theta$ will be represented by the following equation:

$$N_r(I)d \cos\theta = \frac{m'\lambda_{m'}}{2}$$

$$m' = \begin{cases} m+1 & , \phi_1 + \phi_2 = 2\pi \\ m & , \phi_1 + \phi_2 = 0 \end{cases}$$

in the usual cases where $\phi_1+\phi_2=2\pi$ or $\phi_1+\phi_2=0$.

To achieve optimum performance the modulator structure must be admittance matched to the incident medium. By way of example, if the substrate, high refractive index layers and resonator layer are composed of GaAs, having refractive index Ng and the low refractive index layers are composed of AlAs having refractive index Na, and if the structure terminates with a high index layer at the indicident medium interface remote from the substrate, and if the number of low index layers in the inside reflector is y and the number of low index layers in the outside reflector is x, and if the modulator is illuminated at normal incidence then the optical admittance of the modulator structure, Y, is $$Y = Ng(Ng/Na)^{2(x-y)}.$$

If the incident medium is air having optical admittance $Y=1$ to a good approximation, then admittance matching to a good approximation over the full transparency wavelength range of the device is achieved when $$y = x + 4$$

The choice of optical thickness for which operation is to be effected is not critical, but the operating wavelength should be established as being away from a wavelength region where the resonator would exhibit substantially optical gain through laser action.

Modulators formed in accordance with the invention have the significant advantage that they can be formed without requiring formation of mirror facets by cleaving, or etching.

Modulators arranged in side by side position, such as in linear or two-dimensional arrays may be readily constructed.

In one embodiment the modulator may for example be a cylinder having a diameter of approximately 10 micrometers. This will yield good mode matching to small core optical fibres and thus, low insertion loss. The power density at the input/output facets will be small compared to semiconductor waveguide modulators, thus allowing higher power operation without facet damage. These properties, which will also be present in many other embodiments of the device, are advantageous for applications including communications, optical data storage and retrieval, optical computing, and intensity modulation of laser beams.

The described modulator has been advanced merely by way of explanation, and many modifications and variations may be made within the scope of the appended claims.

I claim:

1. A current injection modulator comprising structure defining a single crystal substrate, having some refractive index, on which are positioned, in succession, an inside reflector formed by a first set of epitaxial single crystal layers, a resonator layer, selected according to the equation:

$$\frac{2\pi N_r(V) d \cos\theta}{\lambda_m} - \frac{\phi_1 + \phi_2}{2} = m\pi$$

where $\theta$ is the angle of propagation of light in the resonator layer relative to the normal to this layer, $\phi_1$ and $\phi_2$ are phase shifts of the reflectance, and $N_r(V)$ is the refractive index an outside reflector formed by a second set of epitaxial single crystal layers, at least one part of said structure, being one or more of the inside reflector, substrate and resonator layer, being electrically conductive and of either p-type or n-type conduction, at least another part of said structure, being one or more of the outside reflector, and resonator layer, being made electrically conductive and being of either n-type or p-type conduction, but of different conduction type to said one part, said structure further including first and second electrically conductive means making ohmic contact respectively to said one part and said another part of said structure whereby to enable, by application of electrical potential to said electrically conductive means, an electrical current to flow through said structure to cause it to vary the refractive index of said resonator layer pursuant to changes in the electrical current whereby to vary the light transmissivity of the modulator for modulating a light beam passing through the modulator in accordance with said changes in said electrical current.

2. A current injection modulator as claimed in claim 1 wherein the complex reflectance amplitudes $r_i$ and $r_o$ of the inside reflector and outside reflector are defined as follows:

$$r_i = r_1 \exp(j\phi_1)$$

where $r_1$ is the magnitude of reflectance of the set of layers comprising the inner reflector, and $\phi_1$ is the phase shift on such reflectance, and $$r_o = r_2 \exp(j\phi_2)$$

where $r_2$ is the magnitude of reflectance of the set of layers comprising the outer reflector, and $\phi_2$ is the phase shift on such reflectance.

3. A current injection modulator as claimed in claim 1 or claim 2 wherein the refractive index $N_b$ of the layer of the inside reflector adjacent to the resonator layer, and $N_a$, the refractive index of the layer of the outside reflector immediately adjacent the resonator layer are related to $N_r(I)$, the refractive index of the resonator layer at any particular current through the modulator by:

$$N_b < N_r(I) \text{ if } N_a < N_r(I).$$

4. A current injection modulator as claimed in claim 1 or claim 2 wherein the refractive index $N_b$ of the layer of the inside reflector adjacent to the resonator layer, and $N_a$, the refractive index of the layer of the outside reflector immediately adjacent the resonator layer are related to $N_r(I)$, the refractive index of the resonator layer at any particular current through the modulator either by:

$$N_b > N_r(I) \text{ if } N_a > N_r(I).$$

5. A current injection modulator as claimed in claim 1 wherein the layers comprising at least one said reflector have alternating high and low refractive indices and thicknesses such that a compositional periodicity of optical thickness λ/2 or an odd multiple thereof is achieved, where λ is the longest of a number of possible discrete wavelengths of light to be modulated by the particular device.

6. A current injection modulator as claimed in claim 1 wherein the composition and hence the refractive index of at least one said reflector is varied in a continuous or piece-wise manner such that a compositional periodicity having optical thickness of λ/2 or some odd multiple thereof is achieved.

7. A current injection modulator as claimed in claim 1 wherein said substrate and subsequent material layers are single crystals of materials selected from the group comprising Gallium, Aluminium and Arsenic combined in particular proportions in particular layers.

8. A current injection modulator as claimed in claim 1 wherein substrate and subsequent material layers are single crystals of materials selected from the group comprising Gallium, Indium, Arsenic and Phosphorous combined in particular proportions in particular layers.

9. A current injection modulator as claimed in claims 1 or 2 wherein substrate and subsequent material layers are single crystals of materials selected from the group comprising Gallium, Indium, Aluminium, Arsenic, and Antimony combined in particular proportions in particular layers.

10. A current injection modulator as claimed in claim 1 wherein substrate and subsequent material layers are single crystals of materials selected from the group comprising Mercury, Cadmium, Manganese and Tellurium combined in particular proportions in particular layers.

11. A current injection modulator as claimed in claim 1 wherein substrate and subsequent material layers are single crystals of materials selected from the group comprising Lead, Sulphur Tellurium and Selenium combined in particular proportions in particular layers.

12. A current injection modulator as claimed in any one of claims 7 to 11 wherein said layers are in turn composed of finer layers being superlattice or multi-quantum-well structures.

13. A current injection modulator as claimed in any one of claims 7 to 11 wherein said layers are continuously graded in composition.

* * * * *

UNITED STATES PATENT AND TRADEMARK OFFICE
CERTIFICATE OF CORRECTION

PATENT NO. : 5,093,746

DATED : March 3, 1992

INVENTOR(S) : Peter C. Kemeny

It is certified that error appears in the above-identified patent and that said Letters Patent is hereby corrected as shown below:

In the Abstract, line 19; "pursurant" should be
    --pursuant--.

Col. 8, line 1, "claims" should be --claim--.

Signed and Sealed this

Seventh Day of September, 1993

Attest:

BRUCE LEHMAN

*Attesting Officer*     *Commissioner of Patents and Trademarks*